United States Patent [19] [11] 4,017,978
Peruchon et al. [45] Apr. 19, 1977

[54] DEVICE FOR TAKING AN IMPRESSION AND VISUALIZING SAID IMPRESSION

[75] Inventors: Edouard Peruchon; Pierre Rabischong, both of Montpellier, France

[73] Assignee: Societe Nationale Elf Aquitaine (Production), Courbevoie, France

[22] Filed: Jan. 19, 1976

[21] Appl. No.: 650,402

[30] Foreign Application Priority Data

Jan. 17, 1975 France ............................ 75.01502

[52] U.S. Cl. ......................... 33/174 L; 33/174 PA
[51] Int. Cl.² ......................................... G01B 7/28
[58] Field of Search ............. 33/1 L, 174 L, 174 J, 33/174 PA; 235/151.32; 340/366 CA

[56] References Cited

UNITED STATES PATENTS

| 2,569,433 | 9/1951 | Highberg et al. | 33/174 L |
| 3,733,704 | 5/1973 | Farabaugh | 33/174 L |
| 3,805,036 | 4/1974 | Michaud et al. | 33/174 L |

FOREIGN PATENTS OR APPLICATIONS

| 1,426,466 | 12/1965 | France | 33/174 L |

Primary Examiner—Richard E. Aegerter
Assistant Examiner—Richard R. Stearns
Attorney, Agent, or Firm—Sughrue, Rothwell, Mion, Zinn & Macpeak

[57] ABSTRACT

A multidetector is constituted by a lattice of N rods each having a ferromagnetic portion and slidably mounted within N coils forming the secondary windings of a transformer, each detector being constituted by a rod associated with a coil. The common primary circuit of the transformer is formed by a single coil which surrounds the N secondary windings and is supplied with alternating current of constant amplitude. The rods are brought into contact with an object for taking an impression of a portion of its external surface. The N voltages developed at the terminals of the N secondary coils are transmitted sequentially by a multiplexer to the screen of a storage oscilloscope so as to form the impression by means of N points, a coordinate of each point being a linear function of the voltage developed at the terminal of the corresponding secondary coil.

6 Claims, 7 Drawing Figures

DEVICE FOR TAKING AN IMPRESSION AND VISUALIZING SAID IMPRESSION

This invention relates to a device for taking an impression and visualizing said impression.

It is known that, in order to distinguish objects in media in which visusal observation or ultrasonic-wave detection is impossible, it is necessary to employ feeler devices. When operating conditions are particularly exacting as in submarine media, it is recommended practice to employ rigid feeler devices which are both safe and reliable in order to detect and subsequently to visualize the surface of objects with a view to locating the position or determining the shape of said objects.

The present invention is directed to an impression-taking device which makes it possible to distinguish the shape of an object without any difficulty by means of a multidetector which is capable of operating under water at high pressures, said device being also very convenient to handle.

The impression-taking and visualizing device in accordance with the invention comprises a multidetector consituted by a lattice of N rods each having a ferromagnetic portion, said rods being slidably mounted within N coils. Said coils constitute the N secondary windings of a transformer in which the primary circuit which is common to the N secondary windings is formed by a single coil which surrounds the N secondary windings. The primary circuit is supplied with alternating current from a current source of constant amplitude; the association of a rod with a coil constitutes a detector and the movement of the rod within the coil modifies the value of the flux received by the secondary coil and thus the voltage developed at the terminals of this latter. Said volatage indicates the position of the end of the rod which is in contact with the object.

The device also comprises mechanical means for bringing the N rods of the multidetector into contact with an object from which it is desired to take an impression or in other words to determine the shape of a portion of its external surface; a mechanical arm for bringing the multidetector device into contact with the object is usually employed.

The device also comprises a multiplexer for sequentially transmitting the N voltages developed at the terminals of the N secondary coils to a visualization support usually constituted by the screen of a storage oscilloscope, said support being intended to utilize said N voltages in order to form the impression of the object by means of N points. A coordinate of each point on the visualization support is a linear function of the voltage developed at the terminal of the corresponding secondary coil.

Each coil constitutes a differential transformer which is supplied from the primary winding; said coil is constituted by two windings in series and in opposite directions and the result thereby achieved is that, when the ferromagnetic portion of the sliding rod is located symmetrically with respect to the two windings, no voltage appears at the terminals of the coil; any displacement of said rod produces a voltage at the terminals of said coil. The end portion of the rod (which is intended to come into contact with an object) can advantageously be formed of non-magnetic material in order to prevent channelling of the lines of magnetic flux towards the object in the event that this latter is ferromagnetic since such channelling affects the accuracy of the measurement.

The indications corresponding to the position of each detector was multiplexed towards a visulization support on which are inscribed a series of points having coordinates which are proportional to the displacement of each rod within each coil. A conventional method is employed to display in perspective on the screen of the storage oscilloscope the N points corresponding to the positions of the N detectors on the surface of the object.

Further properties and advantages of the invention will become more readily apparent from the following description of one example of construction which is given by way of explanation and not in any limiting sense, reference being made to the accompanying Figures in which.

Figures 1, 2:
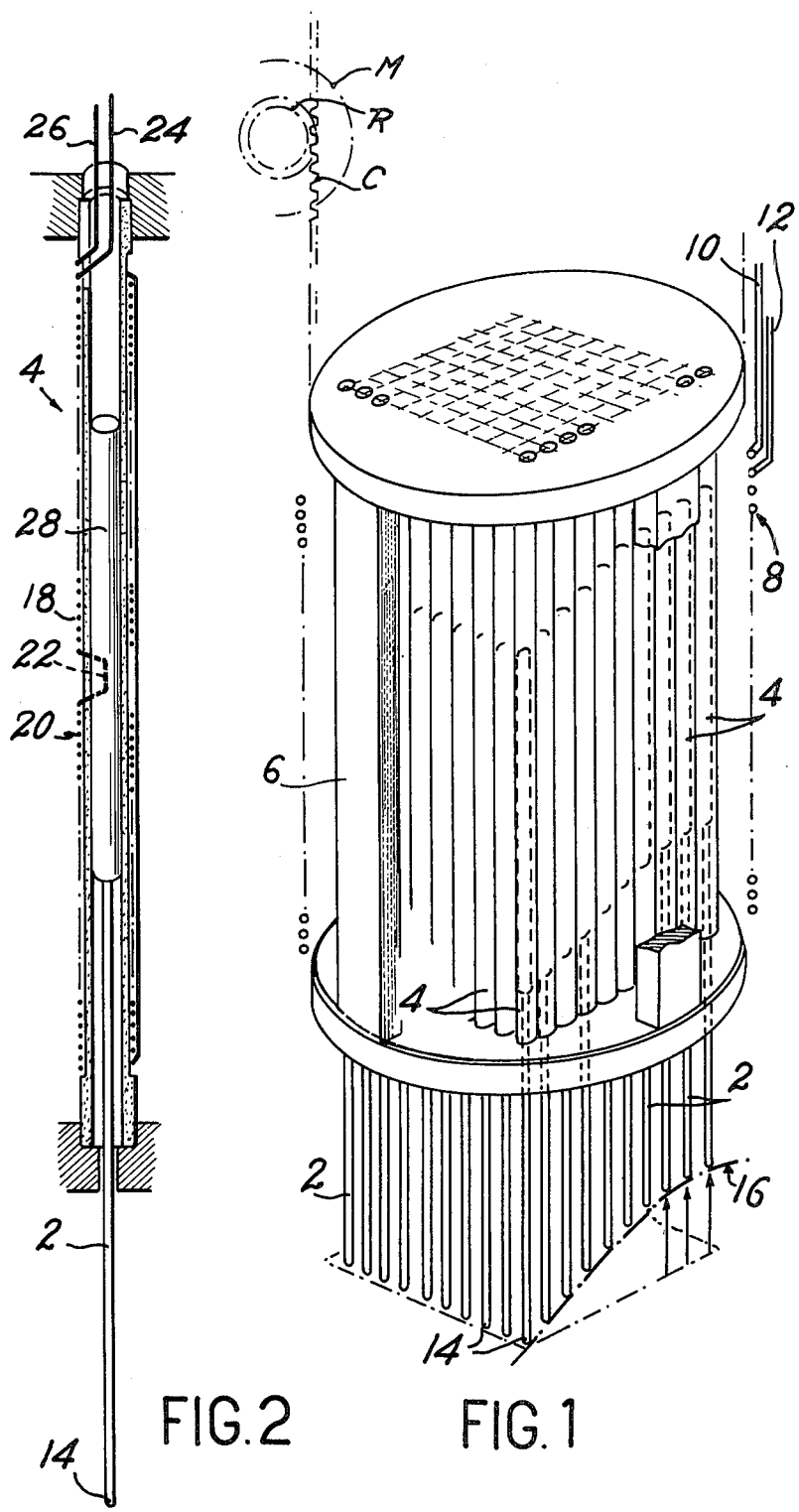
FIG. 1 illustrates the multidetector in which provision is made for a lattice of N detectors in accordance with the invention.
FIG. 2 is a detailed view of a particular detector.

The multidetector in accordance with the invention as shown in FIG. 1 comprise s N rods such as the rods 2 which are slidably fitted within coils such as the coils 4. The lattice structure of the $N = m \times m$ detectors is constituted by a square, each side of which is made up of $m$ detectors placed at uniform intervals. The N detectors are placed within a 6, the winding 8 rigid frame, which constitues a primary circuit, being wound around said frame and connected to an a.c. voltage supply by means of the leads 10 and 12, said supply having been omitted from FIG. 1. A tooth rack C attached to frame 6 is displaced by the engaging toothed wheel R powered by a motor M, and these elements constitute an example of mechanical means to displace the frame and to bring the rods into contact with an object. The tip of each feeler such as the tip 14 rests on the surface of the object 16 so as to reconstitute the shape of said surface by means of the different points of contact.

A mechanical arm or any other system such as a pulley, gear or toothed rack system serves to displace the multiplier in order to bring this latter into contact with the object.

There is shown in FIG. 2 one of the secondary coils such as 4 which is associated with the rod 2 and constitutes a detector. Said first differential transformer which is supplied from the primary circuit of FIG. 1 is constructed of two windings in series, namely the windings 18 and 20 which are wound in opposite directions; the directions of winding change on each side of the power lead 22. Said windings are connected by means of two leads 24 and 26 to an electronic system for detecting the amplitude of the potential developed at the terminals of said coil. The rod 2 which is capable of sliding within the interior of the coil constituted by the two windings 18 and 20 has a ferromagnetic portion 28 which guides the lines of flux within the two secondary windings, said flux being produced by the primary circuit 8 of FIG. 1. Depending on the position of the ferromagnetic portion 28 of the rod 2, the magnetic flux is preferentially received in either the circuit 18 or the circuit 20, thus causing a variation in the potential difference induced between the lines 24 and 26 at the output of the coil. As shown in FIG. 2, the ferromagnetic portion 28 is in the central position and the potential difference at the terminals 24 and 26 of the winding is zero. It is the portion 14 of the rod 2 which is in contact with the object, said portion 14 being non-magnetic.

The multidetector shown in FIGS. 1 and 2 is an equal-pressure detector and is capable of operating under high pressure of liquid whilst the liquid is permitted to circulate within the multidetector without disturbing its operation. This arrangement is advantageous in the case of operation in a liquid atmosphere.

By way of example, the current source which supplies the primary winding is a sinusoidal signal having a frequency of 400 c/s.

Figure 3:
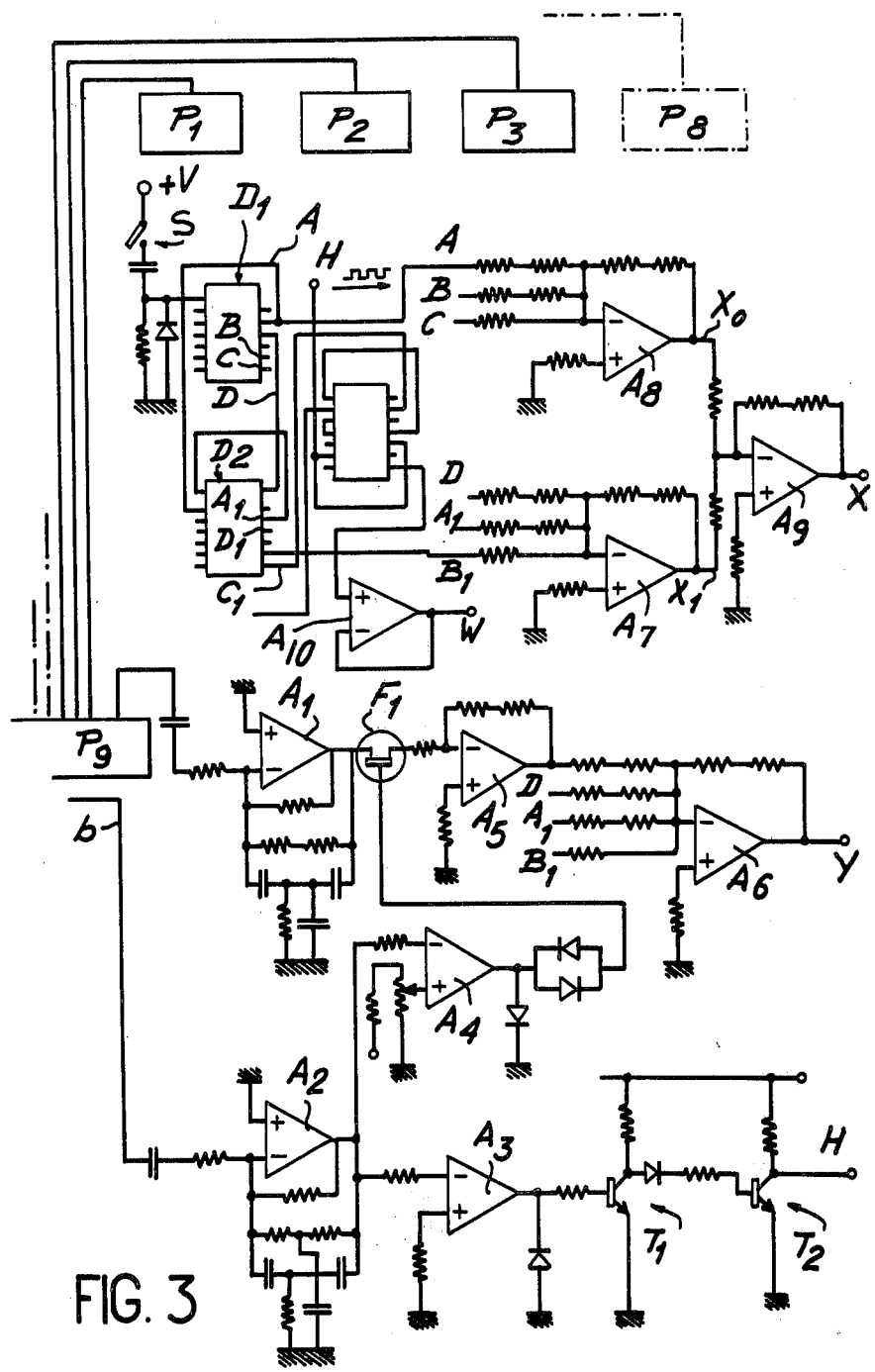
FIG. 3 is a diagram of the electronic circuit for multiplexing the signals.

There is shown in FIG. 3 the electronic diagram of the multiplexer which serves to transmit successively to one channel of the oscilloscope signals which correspond to the amplitude of the voltages developed by each detector. The other channel of the oscilloscope receives the signals which are synchronized by a clock after suitable logical processing. The clock signal activates the Wehnelt electrode of the same osciloscope at uniform time intervals, with the result that a perspective view of the surface of the object can finally be visualized on the screen of the oscilloscope, said surface being reconstituted from N indications given by the multidetector. In this example of construction, the multidetector comprises 64 detectors of a lattice made up of eight lines and eight columns of detectors. In each line, for example, the eight detectors are connected to a multiplexing circuit $P_1, P_2 \ldots P_8$ of the type designated as AM 3705. The inputs of said multiplexer are connected to the outputs A, B, C of the divider through 16 $D_1$. The periodic signals emitted by the clock will be shown in FIG. 4. The outputs of each of the multiplexers of type B are connected to the inputs of another multiplexer $P_9$ of type AM 3705 and the signals $A_1$, $B_1$ and D are applied to the inputs of said multiplexer. These different multiplexers $P_1$ to $P_9$ are such that the amplitudes corresponding to the 64 signals obtained from the 64 detectors are obtained sequentially on the output lead of the multiplexer $P_9$.

The signals such as A, B, C, D, $A_1$, $B_1$ delivered by the dividers via 16 $D_1$ and $D_2$ are fed into the different multiplexers of type $P_i$ and into the amplifiers $A_6$, $A_7$ and $A_8$ so as to produce at X and Y (which are connected to the horizontal and vertical oscilloscope-spot sweep controls) recurrent signals which effect a linear combination of these different signals. The relative amplitude of said signals in the combination is determined by the resistors on each channel at the input of the amplifiers. The clock emits square-wave signals H at a frequency of 400 c/s, namely the same frequency as that of the signal for the supply of the primary winding of the transformer which feeds signals into the secondary coils constituting the detectors. Thus the output signals delivered by each detector are all sampled at the same phase and in fact represent the relative sine-wave amplitudes of the signals produced within each detector, said amplitudes being proportional to the travel of the rod within said detector.

After passing through a transistor $F_1$ said emitted signals are amplified and then transmitted to the channel Y of the oscilloscope. The resistors for connecting the inputs which receive the signals A, B, C to the amplifier $A_8$ are in a geometrical progression having a common ratio of 2 and the same applies to the resistors for connecting the channels D, $A_1$ and $B_1$ to the amplifiers $A_6$ and $A_7$. The closure of the sweep S initiates a single cycle of sweeping of the 64 items of information which are delivered by the detectors; the integrated circuits $A_1$ and $A_2$ which are associated with an RC network constitute two selective filters at a frequency of 400 c/s. The reference $F_1$ designates a field-effect transistor which is caused to cut-off when its gate is brought to a negative potential; when the gate voltage becomes zero, the field-effect transistor $F_1$ is saturated and the source-drain resistor then assumes a low value: the transistor is caused to conduct and the items of information derived from the detectors are sent to the channel Y of the oscilloscope. A 64 secondary coil delivers a sinusoidal voltage $b$ at a frequency of 400 c/s which first passes through the filter $A_2$ and then drives the input of a comparator $A_4$. By adjusting the reference voltage of the amplifier $A_4$ by means of the resistor placed at the positive input, a sampling signal of sufficiently short duration is obtained at the gate of the transistor $F_1$ and square-wave signals equal in height to the amplitude of the signals delivered by the detectors are obtained at the output of the amplifier $A_5$. The synchronizing signal introduced at $b$ and derived from the 65 secondary coil having a fixed (non-differential) iron core is converted to a rectangular signal by the amplifier $A_3$, the recurrence frequency of said signal being that of the fundamental component of the sinewave signal obtained on the 65 coil. The transistors $T_1$ and $T_2$ operate in the saturated switching condition which has the effect of producing the clock signal H which is then fed to one input of the circuit $N_1$. The reference $A_{10}$ designates an impedance-matching circuit which delivers synchronous pulses for switching-off the cathode beam in the transient stages between the appearance of two successive points produced by two different detectors: the channel W is connected to the Wehnelt electrode of the oscilloscope.

Figure 4:
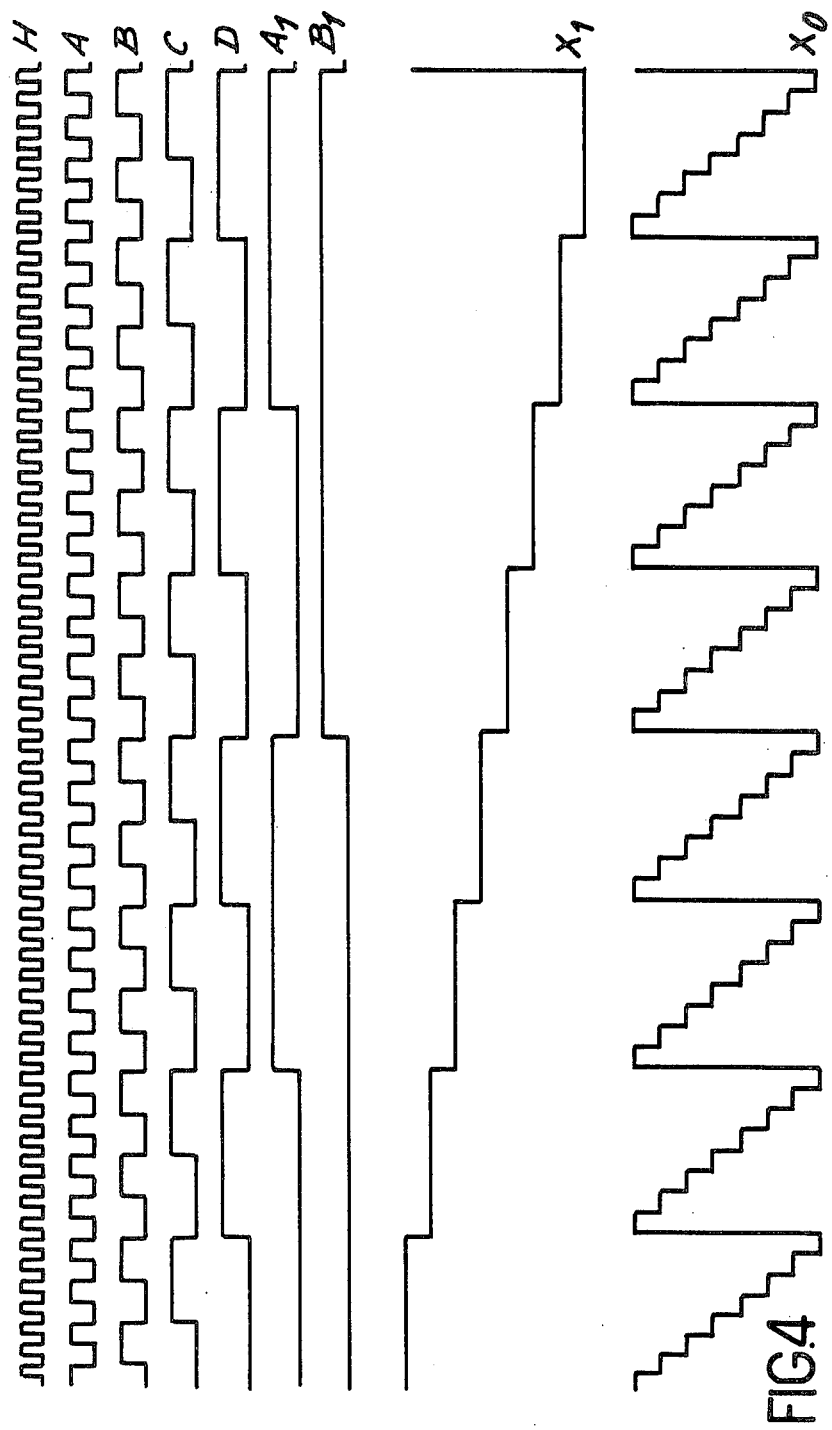
FIGS. 4 and 5 show the different voltage signals obtained at various points of the electronic circuit and applied to the horizontal and vertical deflection control channels of a storage oscilloscope.

There are shown in FIG. 4 the clock signal H and the signals A, B, C, D, $A_1$, $B_1$ emitted by the dividers $D_1$ and $D_2$. The signal $X_1$ which is obtained after the amplifier $A_7$ is a combination of the signals D, $A_1$ and $B_1$, namely a linear combination of the signal D with the coefficient 1, of the signal $A_1$ with the coefficient 2 and of the signal $B_1$ with the coefficient 4. With the combination of the signal $X_1$, there are accordingly obtained eight switchings of signals which are sent by the detectors to the channel Y. The signal $X_0$ is obtained in the amplifier $A_8$ by linear combination of the signals A, B, C. Said signals is obtained by assigning the coefficient 1 to the signal A, the coefficient 2 to the signal B, and the coefficient 4 to the signal C. These combinations are obtained as indicated earlier by varying in the same geometrical proportions having a common ratio of 2 the three input resistors of each amplifier $A_6$, $A_7$ and $A_8$.

Figure 5:
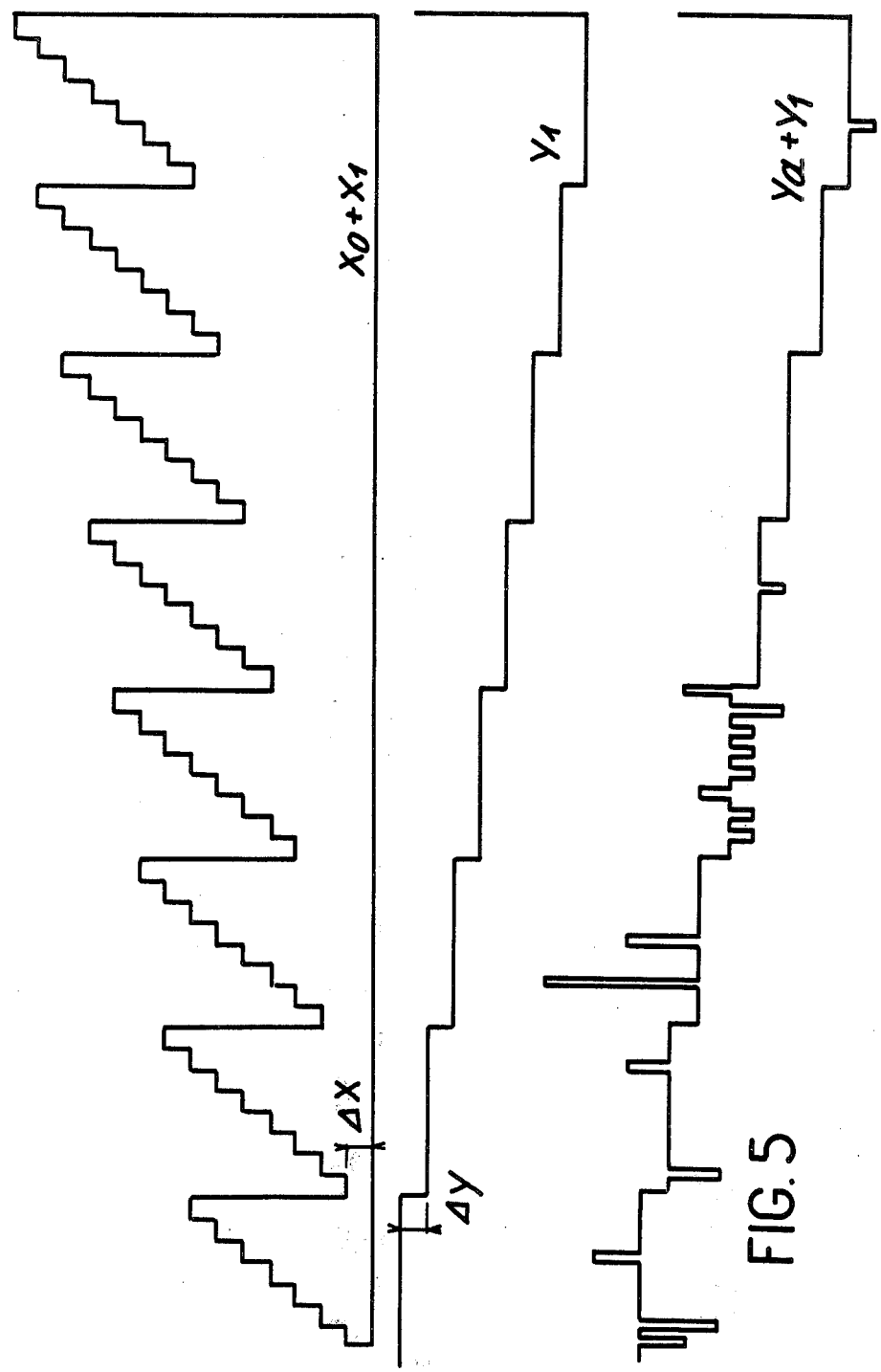

The combination $X = X_0 + X_1$ which is represented in FIG. 5 is transmitted to the channel which controls the sweep of the oscilloscope in the horizontal direction. Similarly, the signal $Y_1$ is obtained by means of the clock signals which are fed into the amplifier $A_6$ in the channels D, $A_1$ and $B_1$, on which is superimposed the signal $Y_a$ derived from one of the sixty-four detectors through the transistor $F_1$. The combination $Y_a + Y_1$ is shown in the final curve of FIG. 5.

Figure 6:
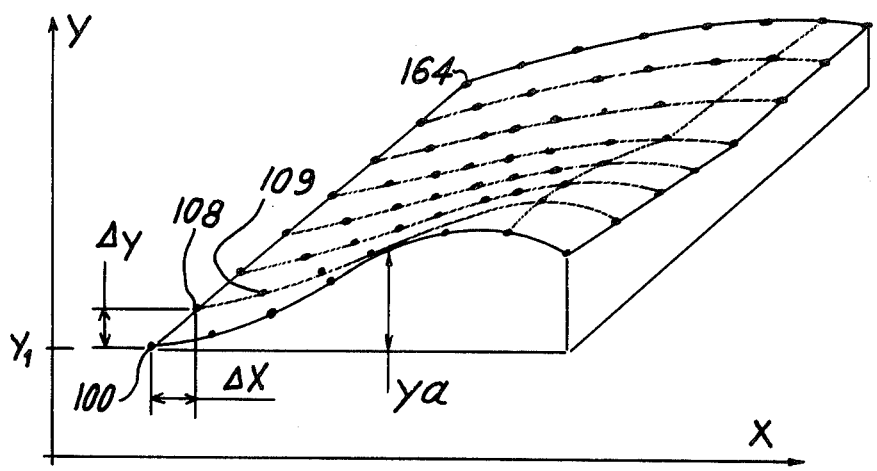
FIG. 6 shows the trace obtained in a storage oscilloscope in which a portion of the surface of the object is reconstructed in perspective.

FIG. 6 shows the pattern which appears as a result of multiplexing of the data obtained from the different detectors on the screen of a storage oscilloscope. The first detector transmits a signal which appears on the oscilloscope at 100. The different values of X in respect of a given line of detectors are incremented as shown on the curve $X_O + X_1$ of FIG. 5. A mean value of Y corresponding to $Y_1$ and an increment $Y_a$ which is proportional to the signal emitted by a detector have been made to correspond in respect of each value of X. In the case of the second row of detectors, the initial value of X is then increased by a value $\Delta X$ as shown on the curve $X_O + X_1$ of FIG. 5 and the value of Y is increased by $\Delta Y$ in order to obtain a perspective view of the points of contact of the second line of detectors. The process is started again on the bases of these new initial values in order to obtain the points such as 108, 109 and so forth. This process is continued until the point corresponding to the last detector or in other words the point 164 is obtained. Sweeping is then completed and the shape of the surface shown in perspective as in FIG. 5 is accordingly obtained. It is readily apparent that the multidetector can be displaced in order to obtain a further series of 64 points on the same screen.

Figure 7:
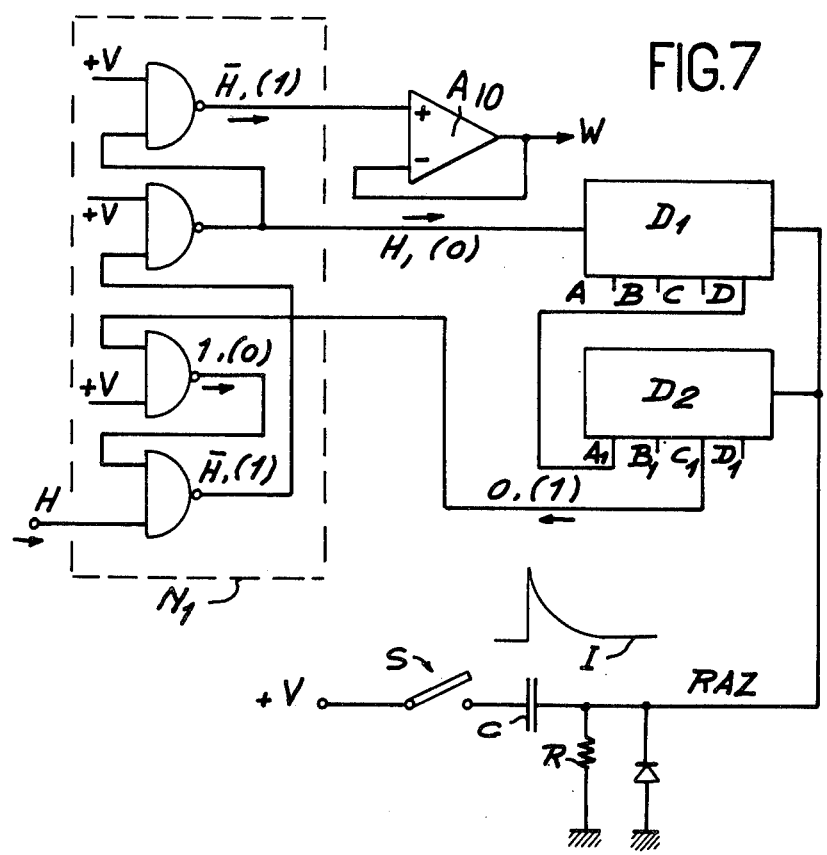
FIG. 7 is a detail view showing a circuit for generating 64 pulses.

There is shown in detail in FIG. 7 the structure of the circuit $N_1$ comprising four NAND gates each having two inputs. The pulse I obtained by closure of the circuit S results in a zero-reset of the elements $D_1$ and $D_2$. The circuit $N_1$ is supplied by the clock signal H. The impedance matching circuit $A_{10}$ delivers a signal W to the Wehnelt electrode of the oscilloscope each time W = 0, that is to say when the clock is at the top level.

The outputs A, B, C, D, $A_1$, $B_1$, $C_1$, $D_1$ change to zero on the trailing edge of the pulse I. The elements $D_1$ and $A_{10}$ receive the clock signal until the input $C_1$ again changes to the value 1 that is to say after 64 pulses. The successive openings of the 64 analog gates and the visulization of the sixty-four points are thus carried out in 64/400 of a second, namely 0.16 second.

What we claim is:

1. A device for taking an impression and visualizing said impression, wherein said device comprises:
   a multidetector constituted by a lattice of N rods, wherein N is a whole number greater than one, each having a ferromagnetic portion, said rods being slidably mounted within N coils, said coils being such as to constitute the N secondary windings of a transformer in which the common primary circuit is formed by a single coil which surrounds the N secondary windings, the primary circuit being supplied with alternating current from a source of alternating current of constant amplitude, the association of a rod with a coil being such as to constitute a detector, wherein the individual positions of said N rods within said N coils are determined by the shape of an external surface of an object with which the multi-detector is brought into contact,
   a multiplexer for sequentially transmitting the N voltages developed at the terminals of the N secondary coils to a visualization means defining at least two coordinates on the viewing portion thereof for reconstituting from said N voltages the impression of the object by means of N points, a coordinate of each point indicated on the visualization means being a linear function of the voltage developed at the terminal of the corresponding secondary coil.

2. A device according to claim 1, wherein the portions of the N sliding rods in contact with the object from which it is desired to take an impression are non-magnetic.

3. A device according to claim 1, wherein the N coils of the secondary winding are each constituted by two windings in series, the directions of the windings within each of said two coils being opposite and wherein the ferromagnetic portion of the rod which is slidably mounted within the two windings is placed in such a manner as to ensure that in the position of equilibrium the currents produced by induction within the windings are of equal intensity and of opposite value so that a zero voltage is developed at the terminals of said coil.

4. A visualization means according to claim 1, wherein said device comprises a storage oscilloscope controlled by the multiplexer, wherein the N rods of the multidetector are arranged in a lattice of $m \times m = N$ detectors, wherein m is a whole number greater than one, and wherein the input of the oscilloscope which controls the deflection along an axis OX is connected to a first electronic means which emits signals constituted by a series of rising steps, the total number of steps being equal to N and the number of said series being equal to m, each series being in turn constituted by m steps, wherein the input of the oscilloscope which controls the deflection along the axis OY is connected to a second electronic means which emits a signal comprising a series of m steps in synchronism with the m series along the axis OX on which are superimposed signals derived from the multiplexer which are proportional to the voltages developed in the N coils, thus making it possible to obtain on the screen of the oscilloscope a perspective view of the shape of the impression measured by the multidetector.

5. A device according to claim 4, wherein a third electronic means supplied by a clock synchronized with said first and second means for controlling deflections OX, OY on the oscilloscope drives the Wehnelt electrode of the oscilloscope when and only when the multiplexer transmits a signal corresponding to a measured voltage to one of the coils.

6. A device according to claim 1, further comprising mechanical means for bringing the N rods of the multidetector into contact with the external surface of the object.

* * * * *